United States Patent
Amano et al.

[11] Patent Number: 5,251,094
[45] Date of Patent: Oct. 5, 1993

[54] TERMINAL ELECTRODES FOR MULTILAYER CERAMIC CAPACITOR AND METHOD OF MANUFACTURE THEREOF

[75] Inventors: Koshi Amano; Masatoshi Mizobata, both of Kyoto, Japan

[73] Assignee: Rohm Co., Ltd., Kyoto, Japan

[21] Appl. No.: 872,804

[22] Filed: Apr. 23, 1992

[30] Foreign Application Priority Data

May 29, 1991 [JP]   Japan .................. 3-126104

[51] Int. Cl.⁵ .......................... H01G 7/00; H01G 1/14
[52] U.S. Cl. ................. 361/308.2; 361/310; 29/25.42
[58] Field of Search ............... 29/25.42; 361/320, 321, 361/308, 309, 310; 264/61

[56] References Cited
U.S. PATENT DOCUMENTS

| | | | |
|---|---|---|---|
| 4,584,629 | 4/1986 | Garcia et al. | 361/321 |
| 4,811,162 | 3/1989 | Maher et al. | 29/25.42 X |
| 4,819,128 | 4/1989 | Florian et al. | 361/321 |

Primary Examiner—Bruce A. Reynolds
Assistant Examiner—Michael D. Switzer
Attorney, Agent, or Firm—Thomas R. Morrison

[57] ABSTRACT

There is provided terminal electrodes and methods of manufacture thereof which overcome the drawbacks of the prior art multilayer ceramic capacitor, namely, thickened terminal electrodes and size variation (low size precision) thereof. A ceramic main body (11) is provided with internal electrodes (12) therein, and terminal electrodes (13) on a front and a rear sides, and at least one of adjacent four sides. The terminal electrode (13) is formed as a three-layer structure consisting of a first external electrode layer (14) of metal highly adhesive to ceramic, a second external electrode layer (15) of metal having solderability, and a third external electrode layer (16) of metal having solder wettability. The three-layer structure of the terminal electrode is approximately 1 to 3 μm thick.

22 Claims, 9 Drawing Sheets

TERMINAL ELECTRODES FOR MULTILAYER CERAMIC CAPACITOR AND METHOD OF MANUFACTURE THEREOF

BACKGROUND OF THE INVENTION

1. Field of the Invention

The present invention relates to a multilayer ceramic capacitor and, more particularly, to the structure of a terminal electrode made up of thin layers and method of manufacture thereof.

2. Description of the Prior Art

Figure 1:
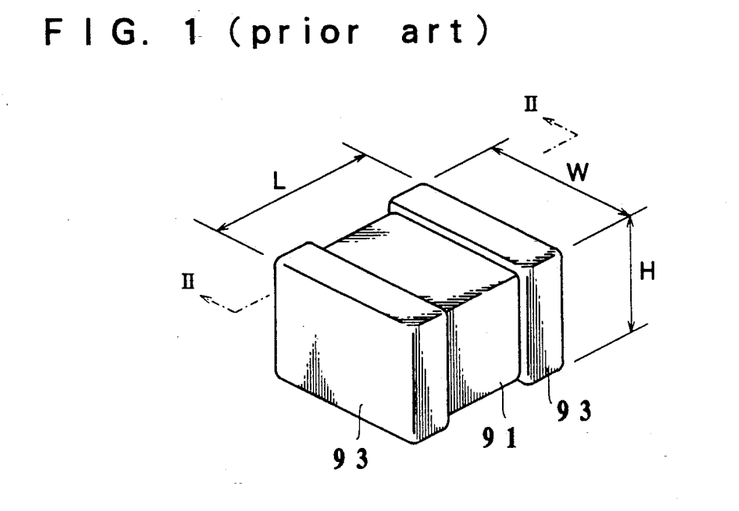
FIG. 1 is a perspective view of a multilayer ceramic capacitor according to the prior art.
Figure 2:
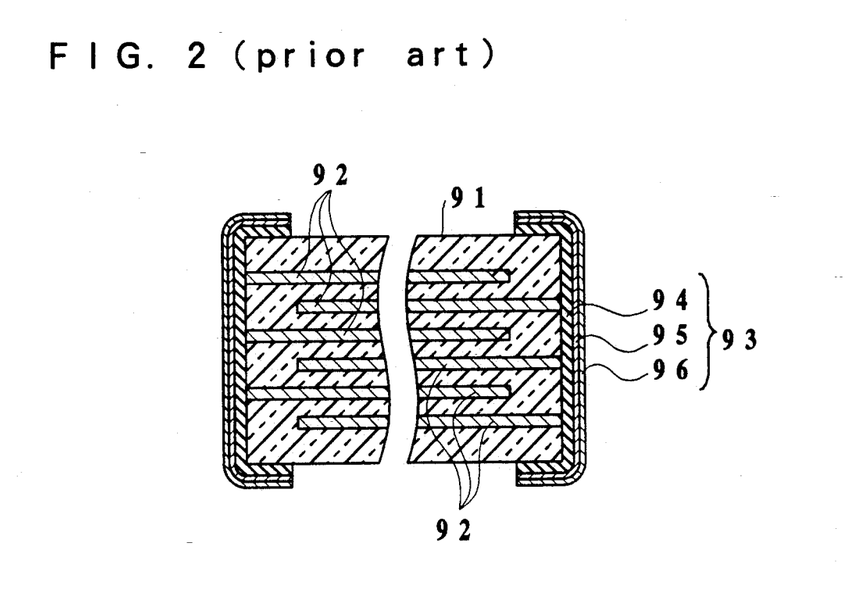
FIG. 2 is a cross-sectional view taken along the line II—II of FIG. 1.

Referring to FIGS. 1 and 2, a multilayer ceramic capacitor in general consists of a hexahedral ceramic main body 91, a plurality of internal electrodes 92 which divide the ceramic main body 91 into a plurality of alternating ceramic layers, and terminal electrodes 93 which are formed on a pair of facing sides of the ceramic main body 91 and make an electrical contact with internal electrodes 92.

In such a capacitor, a prior art Japanese Unexamined Patent Publication No. SHO 60-236207 (236207/1895) discloses a terminal electrode 93 formed as a three-layer structure. A first external electrode layer 94 is formed by coating conductive paste on above facing two sides of the ceramic main body 91. A second external electrode layer 95 is formed by subjecting nickel, copper, or other metals having solderability to sputtering, vacuum evaporation or plasma spray coating on the surface of the first external electrode layer 94. A third external electrode layer 96 is formed by subjecting tin, silver, or other metals having solder wettability to sputtering, vacuum evaporation or plasma spray coating on a surface of the second external electrode layer 95.

However, coating the conductive paste allows the resulting first external electrode layer 94 to have a considerable thickness and to be variable in size. This leads to the fact that the capacitor is made to enlarge in size L and precision thereof is declined. Further, due to additional electrode layers 94 that are formed on four sides besides above-mentioned two sides, the height H and the width, W are also increased and precisions thereof decline as well. Accordingly, a capacitor disclosed in the above prior art includes thick terminal electrodes 93 due to first external electrode layer 94 formed thick, and the size of a product is liable to vary owing to a poor precision.

OBJECTS AND SUMMARY OF THE INVENTION

An object of the present invention, therefore, is to provide terminal electrodes for a multilayer ceramic capacitor which overcomes the drawbacks of the prior art.

It is a further object of the invention to provide a method for forming terminal electrodes for a multilayer ceramic capacitor which overcomes the drawbacks of the prior art.

According to a feature of the invention, there is provided a multilayer ceramic capacitor comprising:

a main body made of ceramic material having an insulating property;

a plurality of internal electrodes formed in the main body, wherein the internal electrode is so constructed as to alternate with adjacent internal electrodes, and an end of each internal electrode is emerged from a side of the main body;

a first external electrode layer made of metal adhesive to ceramic, being formed on a pair of facing sides and at least one of adjacent four sides of the main body by means of sputtering, vacuum evaporation or plasma spray coating;

a second external electrode layer made of metal having solderability, being formed on an outside of the first external electrode layer;

a third external electrode layer made of metal having solder wettability, being formed on an outside of the second external electrode layer; and a terminal electrode consisting of the first external electrode layer, the second external electrode layer, and the third external electrode layer.

According to a further feature of the invention, there is provided a method for manufacturing a multilayer ceramic capacitor comprising the steps of:

installing a main body made of ceramic material having an insulating property into a jig, wherein the jig is so constructed as to allow a pair of facing sides and at least one of adjacent four sides of the main body to be emerged therefrom;

forming a first external electrode layer of metal adhesive to ceramic on an uncovered surface of the main body by means of sputtering, vacuum evaporation or plasma spray coating in such a condition that the main body is installed into the jig;

forming a second external electrode layer of metal having solderability on a surface of the first external electrode layer by means of sputtering, vacuum evaporation or plasma spray coating; and forming a third external electrode layer of metal having solder wettability on a surface of the second external electrode layer by means of sputtering, vacuum evaporation or plasma spray coating.

While the novel features of the invention are set forth in a general fashion, particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Terminal electrodes for a multilayer ceramic capacitor and a method of manufacture thereof according to embodiment of the present invention will be explained hereinbelow.

Figure 3:
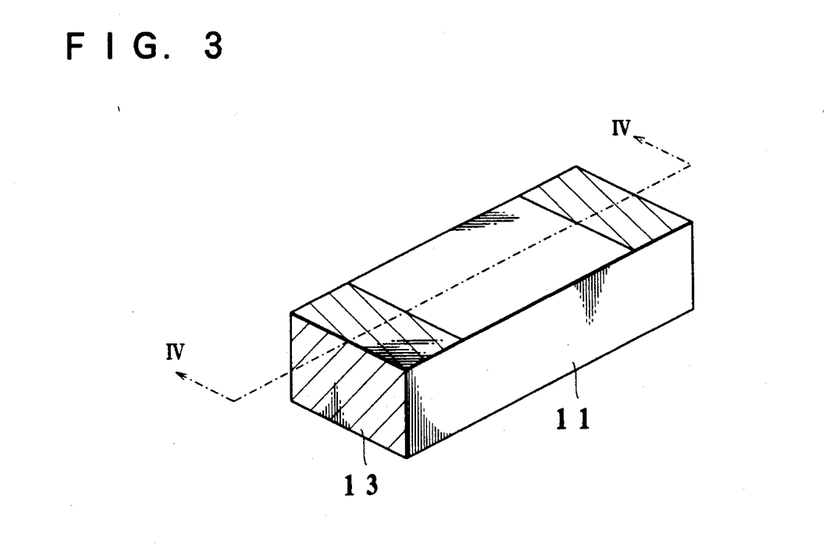
FIG. 3 is a perspective view of a capacitor which has terminal electrodes on a front, a rear, and a top sides according to an embodiment of the present invention.
Figure 4:
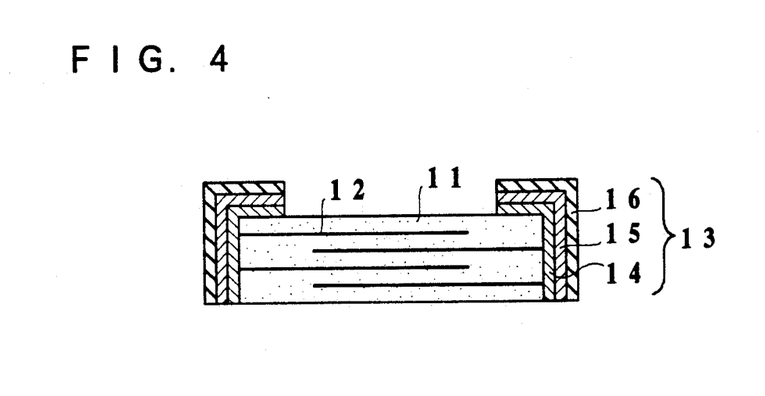
FIG. 4 is a cross-sectional view taken along the line IV—IV of FIG. 3.

Referring to FIGS. 3 and 4, a multilayer ceramic capacitor consists of a hexahedral ceramic main body 11, a plurality of internal electrodes 12 which divide the ceramic main body 11 into alternating ceramic layers, and thin layer terminal electrodes 13 which make an electrical contact with internal electrodes 12. In this embodiment, terminal electrodes 13 are formed on three sides of the ceramic main body 11, that is, on a front side, a rear side, and any one of adjacent four sides (a top side, for convenience's sake). As can be seen in FIG. 3, terminal electrodes 13 on the top side are formed only at both ends thereof, and make an electrical contact with terminal electrodes on the front and rear sides, respectively.

Referring now to FIG. 4, the terminal electrode 13 includes a three-layer structure consisting of a first external electrode layer 14, a second external electrode layer 15, and a third external electrode layer 16. Although the terminal electrode 13 is several μm (approximately 1 to 3 μm) thick, each electrode layer in FIG. 4 is shown in an enlarged scale for a clear understanding of the three-layer structure.

Figure 5:
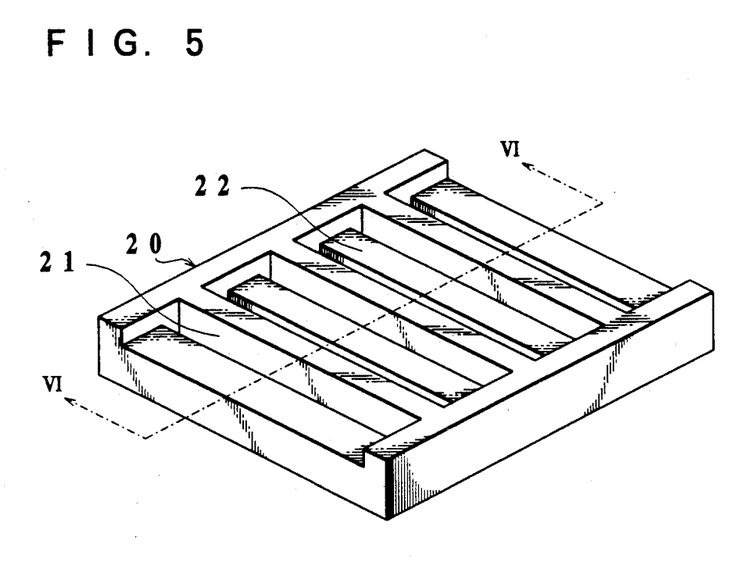
FIG. 5 is a perspective view of a jig for use in forming terminal electrodes on the capacitor of FIG. 3.
Figure 6:
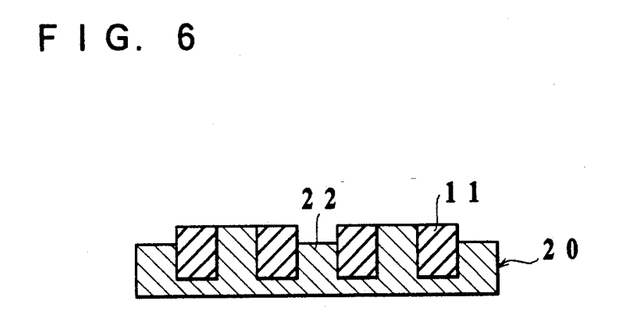
FIG. 6 is a cross-sectional view taken along the line VI—VI of the jig of FIG. 5 with a plurality of ceramic main bodies arranged in grooves.

Next, method for forming the above terminal electrode 13 will be explained hereinafter. For the purpose of forming such a structure, a jig 20 shown in FIG. 5 is used. The jig 20 is made of such an appropriate material as quartz glass, and includes a plurality of grooves 21 for containing ceramic main bodies 11. Further, each groove 21 is provided with a single height 22. An array of ceramic main bodies 11 are installed into grooves 21 of the jig 20, with each one side faced up. In such a condition, as shown in FIG. 6, only one of the front and, rear sides and a limited area of the top side emerge from the jig 20.

In this state, the jig 20 is set into a prior art sputtering machine, and subjected to sputtering using metal such as, for example, chromium, that is highly adhesive to ceramic. By this treatment, first external electrode layers 14 are formed on one of the front and rear sides and one end of the top side of each ceramic main body 11.

Next, nickel, which is capable of soldering, is sputtered onto first external electrode layers 14 using the above sputtering machine, so that second external electrode layers 15 of nickel are formed thereon. Further, third external electrode layers 16 of tin having solder wettability, are formed on second external electrode layers 15 by means of sputtering using above sputtering machine.

Thus, terminal electrodes 13 are formed as a three-layer structure on one of the front and rear sides and one end of the top side of each ceramic main body 11, consisting of the first external electrode layers 14 of chromium that is highly adhesive to ceramic, second external electrode layers 15 of nickel having solderability, and third external electrode layers 16 of tin having solder wettability.

Next, each ceramic main body 11 is turned upside down, and again contained in the jig 20. In this state, the opposite side of facing two sides and the other end of the top side of each ceramic main body 11 are emerged. Then, sputtering is performed three times as described above, so that terminal electrodes 13 are formed as a three-layer structure on the opposite side and the other end of the top side of each main body. The terminal electrode 13 consists of the first external electrode layer 14 of metal such as chromium, the second external electrode layer 15 of nickel, and the third external electrode layer 16 of tin.

Figure 7:
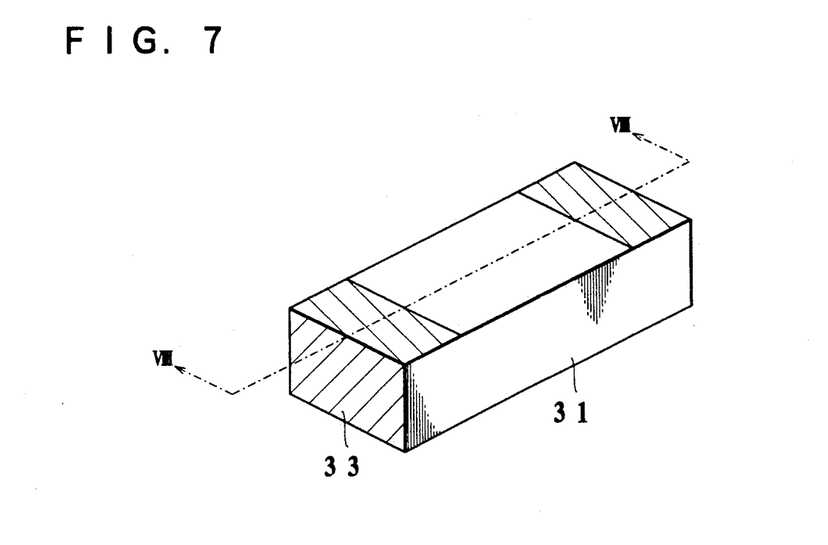
FIG. 7 is a perspective view of a capacitor which has terminal electrodes on a front, a rear, a top and a bottom sides according to another embodiment of the present invention.
Figure 8:
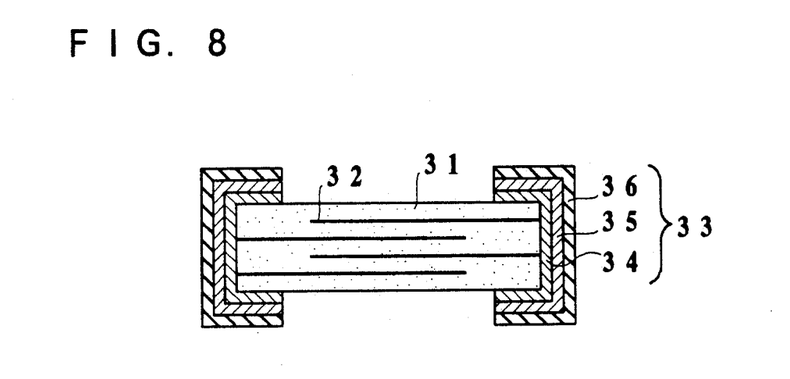
FIG. 8 is a cross-sectional view taken along the line VIII—VIII of FIG. 7.

Referring now to FIGS. 7 and 8, a capacitor is provided with terminal electrodes 33 on four sides of a ceramic main body 31, that is, on a front side, a rear side, and two of adjacent four sides (a top and a bottom sides). The ceramic main body 31 includes internal electrodes 32 therein in a similar manner as the preceding embodiment. Similarly, the terminal electrode 33 is formed as a three-layer structure, consisting of a first external electrode layer 34, a second external electrode layer 35, and a third external electrode layer 36.

Figure 9:
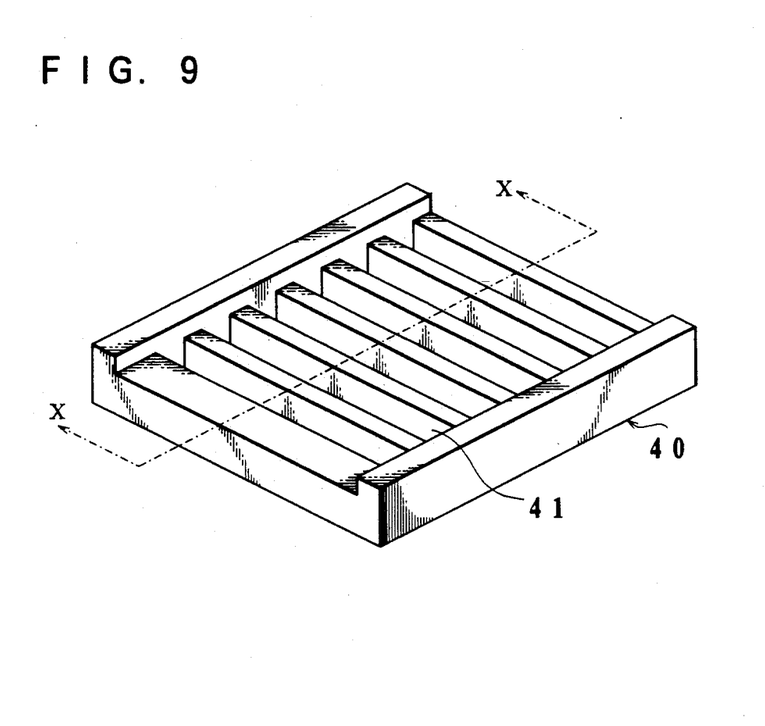
FIG. 9 is a perspective view of a jig for use in forming terminal electrodes on the capacitor of FIG. 7.
Figure 10:
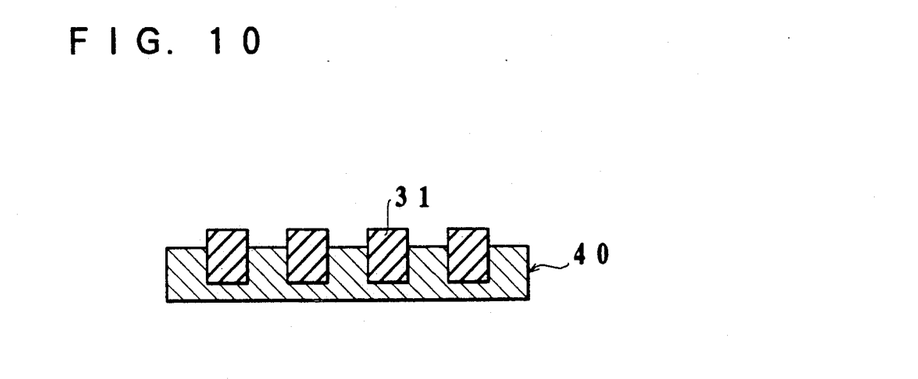
FIG. 10 is a cross-sectional view taken along the line X—X of the jig of FIG. 9 with a plurality of ceramic main bodies arranged in grooves.

A jig for use in forming terminal electrodes on the ceramic main body 31 is shown in FIG. 9. The jig 40 includes a plurality of grooves 41 of uniform shape, and contains ceramic main bodies 31 so as to allow terminal electrode forming sides of each capacitor to be sputtered, as described above (FIG. 10). The jig 40, with an array of ceramic main bodies 31 installed, is set into the sputtering machine, and thereafter sputtering is carried out three times. As a result, terminal electrodes 33 are formed as a three-layer structure on one of the front and rear sides and respective one ends of the top and bottom sides. The terminal electrode 33 consists of the first external electrode layer 34 of chromium, the second external electrode layer 35 of nickel, and the third external electrode layer 36 of tin. Next, each ceramic main body 31 is turned upside down, and again processed in a similar way to thereby form terminal electrodes 33 as a three-layer structure on the opposite side and the respective other ends of the top and bottom sides.

Figure 11:
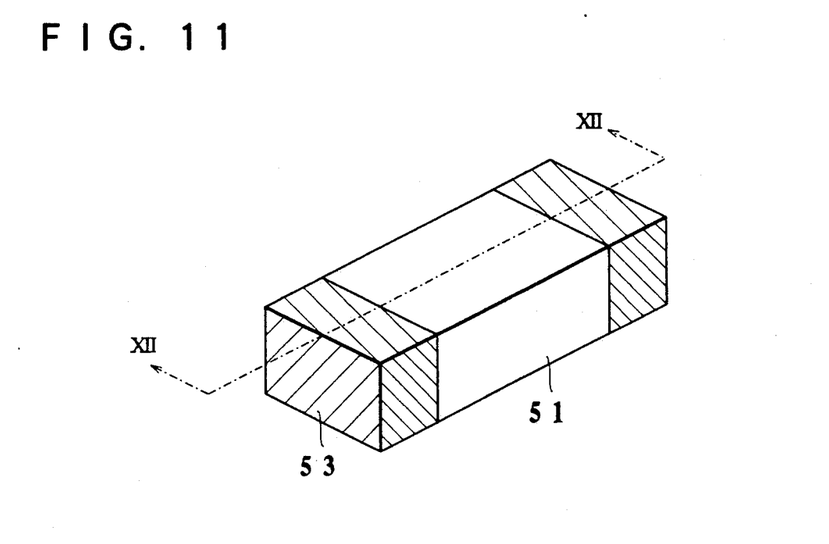
FIG. 11 is a perspective view of a capacitor which has terminal electrodes on a front, a rear, a top, a bottom, and a right sides according to a further embodiment of the present invention.
Figure 12:
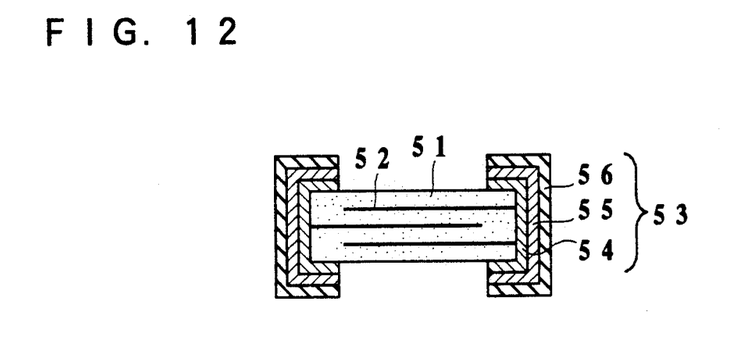
FIG. 12 is a cross-sectional view taken along the line XII—XII of FIG. 11.
Figure 13:
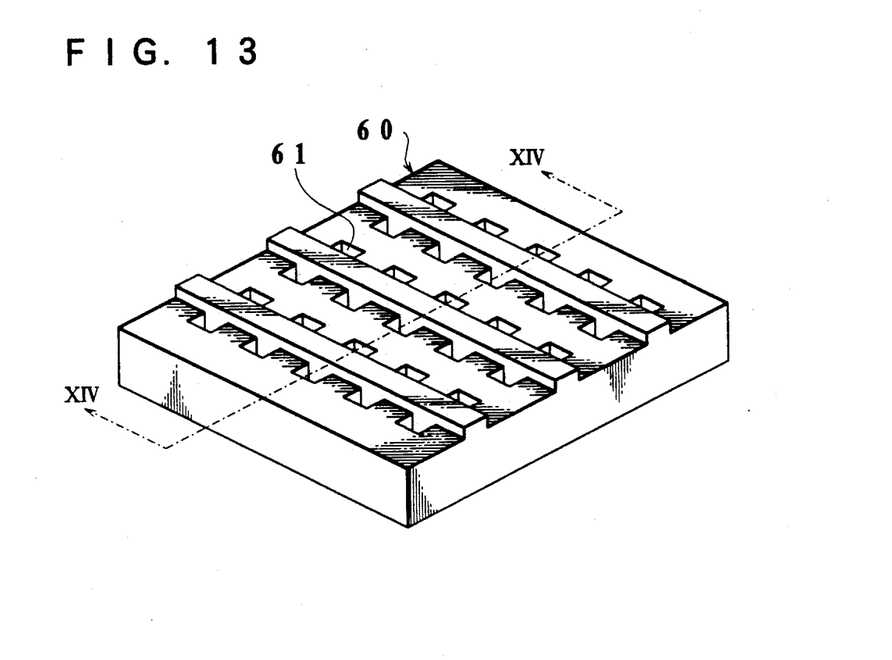
FIG. 13 is a perspective view of a jig for use in forming terminal electrodes on the capacitor of FIG. 11.
Figure 14:
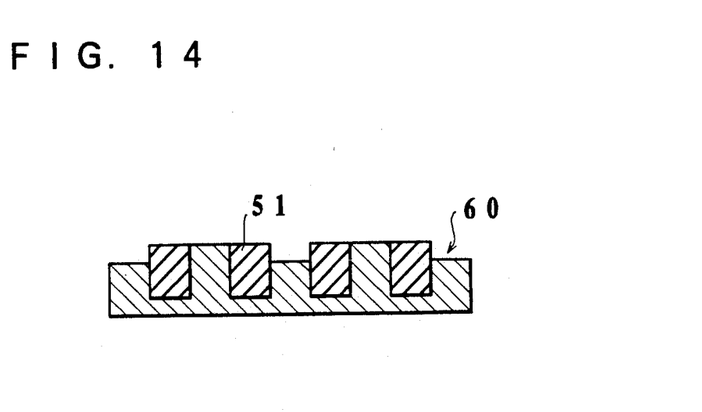
FIG. 14 is a cross-sectional view taken along the line XIV—XIV of the jig of FIG. 13 with a plurality of ceramic main bodies arranged in holes.

Referring now to FIGS. 11 and 12, a capacitor is provided with terminal electrodes 53 on five sides of a ceramic main body 51, that is, on a front side, a rear side, a top side, a bottom side, and a right side. The capacitor is made up of a ceramic main body 51, internal electrodes 52, and terminal electrodes 53 formed as a three-layer structure. The terminal electrode 53 consists of a first external electrode layer 54, a second external electrode layer 55, and a third external electrode layer 56.

For the purpose of forming such terminal electrodes, a jig 60 having a plurality of holes 61 is used, as shown in FIG. 12. The jig 60, with ceramic main bodies 51 installed into holes 61, is set into the sputtering machine, and thereafter sputtering is carried out three times in such a manner as described above, with the result that terminal electrodes 53 are formed as a three-layer structure on above-mentioned five sides of the ceramic main body 51.

Figure 15:
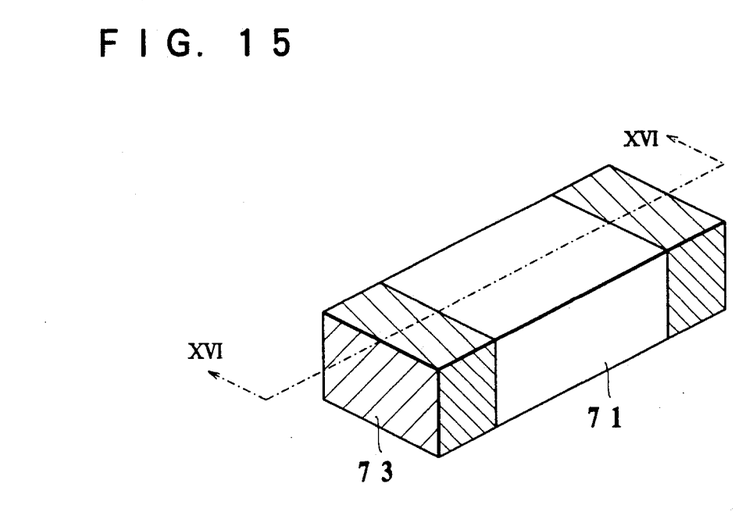
FIG. 15 is a perspective view of a capacitor which has terminal electrodes on a front, a rear, a top, a bottom, a right, and a left sides according to a still further embodiment of the present invention.
Figure 16:
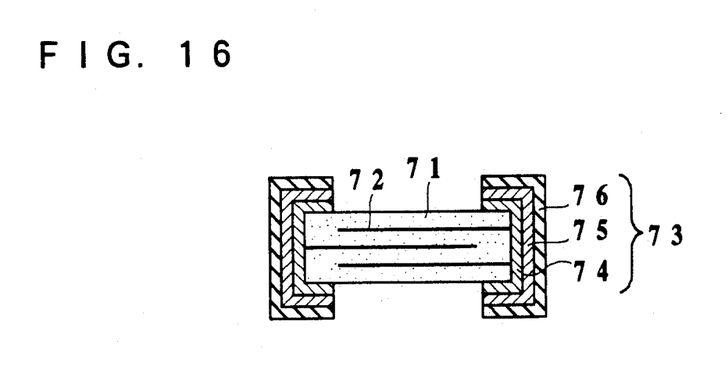
FIG. 16 is a cross-sectional view taken along the line XVI—XVI of FIG. 15.

Referring now to FIGS. 15 and 16, terminal electrodes 73 are formed on all of six sides of a hexahedral ceramic main body 71 of a capacitor, that is, on a front side, a rear side, a top side, a bottom side, a right side, and a left side. The capacitor is made up of the ceramic main body 71 having internal electrodes 72 therein, and terminal electrodes 73 formed as a three-layer structure consisting of a first external electrode layer 74, a second external electrode layer 75, and a third external electrode layer 76.

Figure 17:
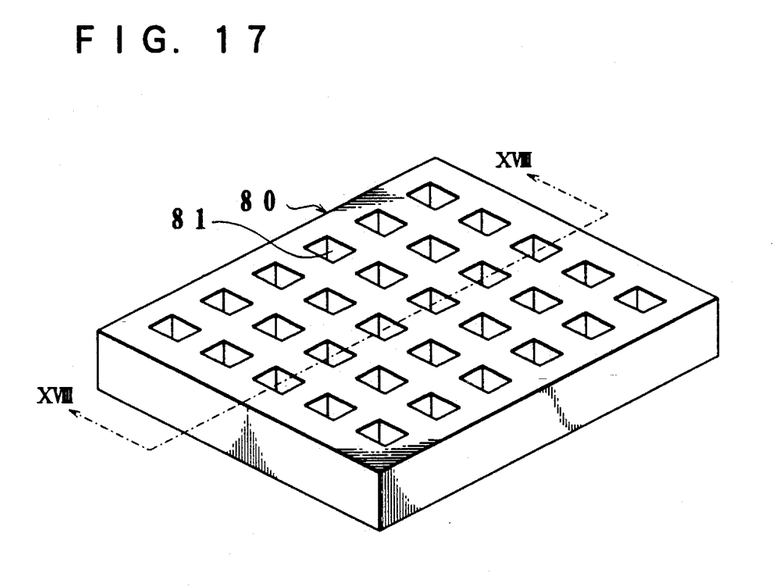
FIG. 17 is a perspective view of a jig for use in forming terminal electrodes on the capacitor of FIG. 15.
Figure 18:
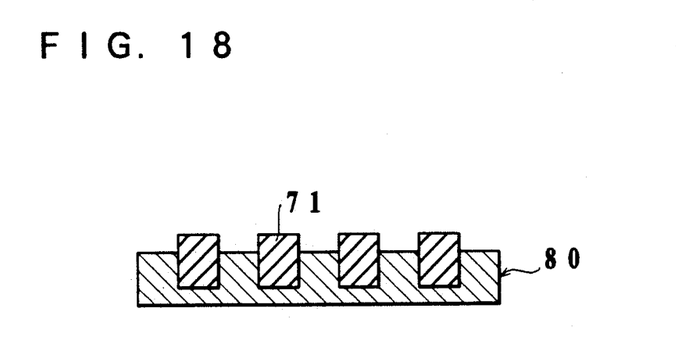
FIG. 18 is a cross-sectional view taken along the line XVIII—XVIII of the jig of FIG. 17 with a plurality of ceramic main bodies arranged in holes.

A jig for use in such forming terminal electrodes 73 is shown in FIG. 17. The jig 80 has a simple structure including a plurality of rectangular-parallelopipedic holes 81. FIG. 18 shows the jig 80 in a condition in which ceramic main bodies 81 are contained in holes 81. In this state, the jig 80 is set into the sputtering machine, and subjected to sputtering to thereby form terminal electrodes 73 as a three-layer structure on every sides of each ceramic main body 71.

In each embodiment described above, a first, a second and a third external electrode layers are formed by means of sputtering, respectively. However, this method may be substituted for by vacuum evaporation or plasma spray coating. In addition, although a second external electrode layer is made of nickel, it may be made of metal such as, for example, copper which is capable of soldering. Similarly, a third external electrode layer may be made of such metal having solder wettability as silver as a substitute for tin.

As described above, in a multilayer ceramic capacitor of the present invention, terminal electrodes are formed on a front and a rear sides, and at least one of adjacent four sides of a ceramic main body by any convenient method such as sputtering, vacuum evaporation or plasma spray coating. Further, the terminal electrode has a three-layer structure consisting of a first, a second, and a third external electrode layers. Accordingly, the resulting multilayer ceramic capacitor has the following advantages.

(1) Since the third or outer electrode layer has solder wettability, a land of customary shape, which is used for a conventional capacitor having thick terminal electrodes, is available when mounting the capacitor on a board. For this reason, the need for a land having special shape is eliminated.

(2) Since every electrode layers are formed by means of sputtering, vacuum evaporation or plasma spray coating, the terminal electrode obtained is approximately several μm thick. This is considerably thinner than that of a prior art capacitor whose first external electrode layer is formed by coating conductive paste.

(3) Owing to terminal electrode formed thin, thickness of the terminal electrode is, by far, less variable as compared with that of the prior art thick terminal electrodes. Consequently, capacitor is allowed to have better size precision (length, height, and width).

In addition, in a method for forming a multilayer ceramic capacitor according to the present invention, terminal electrodes are formed by means of sputtering, vacuum evaporation or plasma spray coating using a jig which is shaped to allow only processing sides (a front and a rear sides, and at least one of adjacent four sides) of a ceramic main body to emerge therefrom. Accordingly, the resulting multilayer ceramic capacitor has the following advantages.

(4) Contrary to the conventional method in which terminal electrodes are formed on every sides of a ceramic main body and thereafter unnecessary electrodes are etched to remove, terminal electrodes are formed only on predetermined parts from the beginning. Therefore, terminal electrodes can be readily manufactured and manufacturing cost thereof can be lowered.

(5) Since every electrode layers are formed by means of sputtering, vacuum evaporation or plasma spray coating, any possible frit diffusion to the ceramic main body can be suppressed. Hence, ceramic strength is sufficient in the vicinity of terminal electrodes.

(6) In contrast with the conventional wet metal plating method in which products are influenced by a metal plating solution, every electrode layers are formed by means of sputtering, vacuum evaporation or plasma spray coating. Accordingly, the decline in strength of a ceramic main body is avoidable.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A multilayer ceramic capacitor, comprising:
   a main body made of ceramic material having an insulating property;
   a plurality of internal electrodes in said main body, wherein said plurality of internal electrodes alternate with adjacent internal electrodes, and an end of each internal electrode emerges from a side of said main body;
   a first and a second external electrode on first and second opposite ends of said main body, respectively;
   said first external electrode on said first end extending onto at least one of adjacent four sides of said main body;
   said second external electrode on said second end extending onto said at least one of said adjacent four sides of said main body; and
   said first external electrode on said first end, and said second external electrode on said second end being omitted from at least one of said adjacent four sides, whereby a dimensional accuracy of said first and second external electrodes is improved.

2. A multilayer ceramic capacitor as claimed in claim 1, wherein:
   said first and second external electrodes include at least first, second and third layers;
   said first layer being a metal adhesive to ceramic;
   said second layer being a solderable metal on said first layer; and
   said third layer being a solderable, wettable metal on said second layer.

3. A multilayer ceramic capacitor as claimed in claim 2, further comprising:

said first layer is chromium; and
said second layer is nickel.

4. A multilayer ceramic capacitor as claimed in claim 2, wherein said third layer is tin.

5. A method for manufacturing a multilayer ceramic capacitor, comprising the steps of:

installing a main body made of ceramic material having an insulating property into a jig, wherein said jig is so constructed as to allow a pair of facing sides and at least one of adjacent four sides of said main body to be emerged therefrom;

forming a first external electrode layer of metal adhesive to ceramic on an uncovered surface of said main body by means of sputtering, vacuum evaporation or plasma spray coating in such a condition that said main body is installed into said jig;

forming a second external electrode layer of metal having solderability on a surface of said first external electrode layer by means of sputtering, vacuum evaporation or plasma spray coating; and forming a third external electrode layer of metal having solder wettability on a surface of said second external electrode layer by means of sputtering, vacuum evaporation or plasma spray coating.

6. A method for manufacturing a multilayer ceramic capacitor as claimed in claim 5, wherein said first external electrode layer is made of chromium.

7. A method for manufacturing a multilayer ceramic capacitor as claimed in claim 5, wherein said second external electrode layer is made of nickel.

8. A method for manufacturing a multilayer ceramic capacitor as claimed in claim 5, wherein said third external electrode layer is made of tin.

9. A multilayer ceramic capacitor, comprising:

a main body of ceramic material having an insulating property;

a plurality of internal electrodes in said main body;

said plurality of internal electrodes alternate with adjacent internal electrodes, and an end of each internal electrode emerges from a side of said main body;

a first external electrode layer of a metal adhesive to ceramic, formed on a pair of opposite ends of said main body, and at least one of adjacent four sides of said main body;

a second external electrode layer over said first external electrode layer;

said second external electrode layer being of a metal having solderability;

a third external electrode layer of tin on an outside of said second external electrode layer; and said first, second and third electrode layers being omitted from at least one of said adjacent four sides of said main body.

10. A multilayer ceramic capacitor, comprising:

a ceramic body having an insulating property;

said ceramic body having first, second, third and fourth sides and first and second ends;

a plurality of interleaved internal electrodes having ends alternately emerging from said first and second ends of said ceramic body;

a first external electrode of metal adhesive to ceramic, formed on at least one of said first and second ends of said ceramic body; and said first electrode extending a predetermined distance from said at least one of said first and second ends, over at least one, but not all, of said first, second, third and fourth sides.

11. A terminal electrode for a ceramic capacitor having a main body including first and second ends and first, second, third and fourth sides, comprising:

an external electrode on at least one of said first and second ends of said ceramic body; and said external electrode extending a predetermined distance from said at least one of said first and second ends, over at least one, but not all, of said first, second, third and fourth sides.

12. A multilayer ceramic capacitor as claimed in claim 11, wherein said external electrode further comprises:

a first layer of a metal adhesive to ceramic;

a second layer of solderable metal on said first layer; and a third layer of solderable, wettable metal on said second layer.

13. A multilayer ceramic capacitor as claimed in claim 12, further comprising:

said first layer is made of chromium; and said second layer is made of nickel.

14. A multilayer ceramic capacitor as claimed in claim 12, wherein said third layer is made of tin.

15. A multilayer ceramic capacitor, comprising:

a ceramic body having an insulating property;

said ceramic body having a plurality of sides and a first and second ends;

a plurality of internal electrodes having ends alternately emerging from said first and second ends of said ceramic body;

a first external electrode of metal adhesive to ceramic, formed on said first end of said ceramic body;

said first electrode extending a predetermined distance from said end, over at least one, but not all, of said plurality of sides;

a second electrode layer of a solderable metal on said first electrode; and a third electrode layer of solderable, wettable metal on said second electrode.

16. A terminal electrode for a ceramic capacitor having an end and a plurality of sides, comprising:

at least one external electrode having a plurality of layers on said end of said ceramic body; and said at least one electrode extending a predetermined distance from said end, over at least one, but not all, of said plurality of sides.

17. A multilayer ceramic capacitor as claimed in claim 16, wherein said plurality of layers comprises:

a first layer of a metal adhesive to ceramic;

a second layer of solderable metal on said first layer; and a third layer of solderable, wettable metal on said second layer.

18. A multilayer ceramic capacitor as claimed in claim 17, further comprising:

said first layer is made of chromium; and said second layer is made of nickel.

19. A multilayer ceramic capacitor as claimed in claim 17, wherein said third layer is made of tin.

20. A terminal electrode for a ceramic capacitor having first and second ends and first, second, third and fourth sides, comprising:

a first external electrode of metal on at least one of said first and second ends of said ceramic body;

said first external electrode extending a predetermined distance from said end, over at least one, but not all of, said first, second, third and fourth sides;

a second electrode layer of a solderable metal on said first electrode; and a third electrode layer of tin on said second electrode.

21. A multilayer ceramic capacitor, comprising:

a ceramic body having an insulating property;

said ceramic body having first, second, third and fourth sides and first and second ends;

a plurality of internal electrodes having ends alternately emerging from said first and second ends of said ceramic body;

a first external electrode of metal on at least one of said first and second ends of said ceramic body;

said first external electrode extending a predetermined distance from said at least one of said first and seconds ends, over at least one, but less than all of, said first, second, third and fourth sides;

a second electrode layer of a solderable metal on said first electrode; and a third electrode layer of tin on said second electrode.

22. A multilayer ceramic capacitor, comprising:

a main body made of ceramic material having an insulating property;

said main body having first and second ends;

a plurality of internal electrodes in said main body, wherein said plurality of internal electrodes alternates with adjacent internal electrodes, and an end of each internal electrode emerges from one of said first and second ends of said main body;

a first external electrode on said first end of said main body;

said first external electrode extending on at least a first side of said main body;

said first external electrode being absent from at least a second side of said main body;

a second external electrode at said second end of said main body; and said second external electrode extending on said at least a first side of said main body;

said second external electrode being absent from said at least a second side of said main body, whereby dimensional accuracy of said capacitor at said first and second external electrodes is improved.

* * * * *